INVENTOR
Gerhard B. Entz

April 14, 1959

G. B. ENTZ 2,881,753

MACHINES FOR CUTTING OR SPLITTING CONCRETE BLOCKS AND THE LIKE

Filed July 26, 1955

INVENTOR
Gerhard B. Entz

BY

ATTORNEYS

April 14, 1959 G. B. ENTZ 2,881,753
MACHINES FOR CUTTING OR SPLITTING CONCRETE
BLOCKS AND THE LIKE
Filed July 26, 1955 6 Sheets-Sheet 5

INVENTOR
Gerhard B. Entz

BY *Lancaster, Allwine & Rommel*
ATTORNEYS

United States Patent Office 2,881,753
Patented Apr. 14, 1959

2,881,753

MACHINES FOR CUTTING OR SPLITTING CONCRETE BLOCKS AND THE LIKE

Gerhard B. Entz, Oklahoma City, Okla.

Application July 26, 1955, Serial No. 524,476

12 Claims. (Cl. 125—23)

This invention relates to machines for cutting or splitting building material. The machines are particularly well adapted for use in dividing concrete blocks into parts of smaller size, although the machine is useful in dividing other building material such as bricks or tiles, into parts of smaller sizes. It embodies some of the features disclosed and claimed in my copending application for patent relating to stone cutting machines filed November 9, 1954, Serial No. 467,699, now Patent 2,762,359, according to which several attendants may be required to feed, and control operations of the machine, and remove the pieces of stone cut by the machine. While the stone cutting machine is particularly useful in cutting in succession, stone pieces of irregular shape and thickness into smaller pieces, the present invention contemplates operation on a series of units, such as concrete blocks, of substantially uniform size, during a run of the machine, but is adjustable so that its use is not confined to operation on any particular size of units. By way of example, a practical embodiment of the present invention is adaptable to cutting or splitting concrete blocks in width of 8, 12 and 16 inches, thickness from 2 inches up to 8 inches, and length from 16 inches to 24 inches.

The principal object of the invention is to provide machines of this character which are automatic in operation in that, when the machine is properly adjusted and in motion, it requires only the blocks to be laid upon a table and the cut material removed after the cutting operation, in contradistinction to machines requiring an attendant to manipulate hand controls for each cutting operation.

Another object is to provide machines of this character which can be operated at high speed and in a practical application of the invention it has been found possible to cut or split from 11 to 14 blocks, each into two parts, per minute, 10,000 building blocks per day.

Further objects are to provide machines of this character by the use of which each block is split to provide two pieces, one face of each of which varies in texture of pleasing and inviting appearance similar to broken natural stone, in contradistinction to the sameness of texture of molded blocks, even where one face, intended to be exposed to view in erected walls, is molded to simulate stone; and to also avoid the breaking or splitting of the blocks at zones other than where wanted, that is, to avoid crosswise breaks or shattering, resulting in culls.

Other objects and advantages of machines will appear in the following detailed description of a highly successful embodiment of my invention, taken in connection with the accompanying drawings, forming a part of this specification, and in which drawings.

The machine, in the example shown, comprises a base 22; a frame 23 secured upon the base; upper and lower work splitting jaws 24 and 25, which are normally wide open and are provided with upper and lower sets of chisels 26 and 27, respectively, between which the work pieces 28, such as concrete blocks, are acted upon in succession for the splitting operations; means 30 to move and support the work pieces in position between the jaws; means 31 to facilitate feeding and guiding of the work pieces with respect to means 30; means 32 to guide and retain the work piece in proper position with respect to the jaws for the splitting operation; means 33 to initially cause engagement of the upper chisels 26 with the work piece 28; means 34 to set the chisels 26 and 27 of the upper and lower jaws 24 and 25, with the cutting edges of the chisels in firm engagement with the upper and lower faces of the work piece, according to the contours thereof; means 35 to move the jaw 25 toward the jaw 24 to split the work piece and return it to the normal wide open position with respect to the jaw 24; means 36 to adjustably limit the extent to which the lower jaw 25 may descend with respect to the upper jaw 24 so as to adapt the machine for speedy splitting of work pieces according to their thickness; means 37 to limit the extent to which the lower jaw may move toward the upper jaw; means 38 to automatically operate the means 30, 33, 34 and 35 in succession; and means 39 to selectively raise the lower jaw 25 to abnormal position limited by means 37 for adjusting purposes, by manually operating means 33.

The base 22 may be a piece of rectangular or other polygonal shaped sheet metal, since such affords a desirable flat upper surface upon which various parts of the machine are mounted and secured, as hereinafter described, and provides a substantial base for mounting on a trailer, not shown in the drawing. An example of such a trailer is disclosed in my copending application for patent on mechanism for raising and lowering frames of trailers with respect to the ground wheels thereof, filed November 2, 1953, Serial No. 389,753, now Patent 2,762,631, and whereby the splitting machine may be conveniently transported to the building site where split blocks are to be used, and operated there instead of a place remote from such site.

Figures 1, 6, 7, 8:
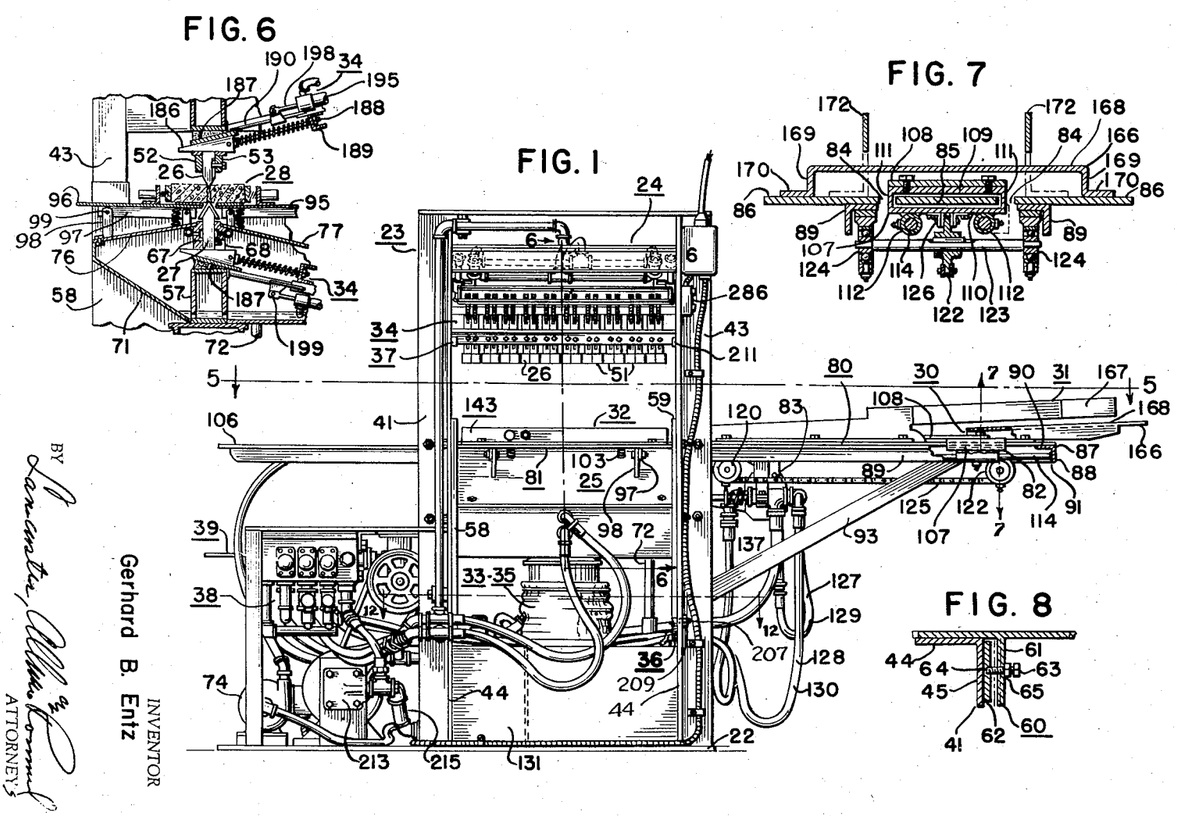
Fig. 1 is a right side elevational view of the machine, some parts thereof being broken away and shown in vertical section to disclose preferred details.
Figs. 6 and 7 are cross sectional views on substantially the lines 6—6 and 7—7 of Fig. 1.
Fig. 8 is an enlarged horizontal detailed sectional view on the line 8—8 of Fig. 3.

As to the frame 23 it preferably comprises a front pair of spaced standards 40 and 41 and a rear pair of spaced standards 42 and 43, these four standards each being preferably of angular cross section and secured upon the base 22 in positions so as to each have an outer flange 44 and an inner flange 45 shown in Fig. 8; a top plate 47 joined to the upper ends of the four standards; and front and rear vertically disposed transverse webs or plates 48 and 49 joining the standards of each of the front and rear pairs thereof.

Figure 4:
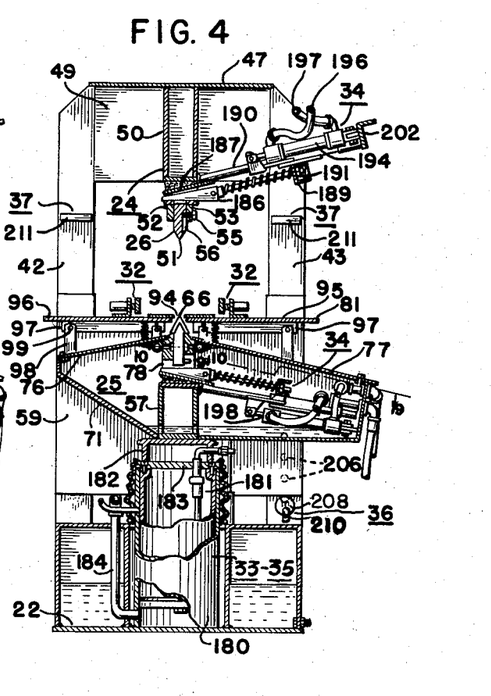
Fig. 4 is a vertical cross sectional view on substantially the line 4—4 of Fig. 2.

It is preferred to have the upper jaw 24 in the main, rigid with frame 23 and to make this jaw of a construction similar to the upper jaw of the stone cutting machine shown in my aforesaid Patent 2,762,359, in that it comprises an upper beam or elongated horizontal reaction member 50, which may conveniently be secured to the webs or plates 48 and 49 at ends, and to the underside of top plate 47; and a plurality of chisels 26 each having a lower straight horizontal cutting edge 51, the chisels being independently movable in substantially a vertical plane, and supported by spaced horizontal chisel bars 52 and 53 secured together at ends by hangers 54 carried by the reaction member 50, these chisel bars supporting the chisels with their cutting edges in the vertical plane, above referred to. The chisels 26 are preferably arranged so that each is limited in its downward movement by a screw 55 carried by the bar 53, the end of the screw loosely fitting in a vertical slot 56 open to the bottom portion and the side of the chisel confronting the bar 53, the screw engaging the closed end of the slot to limit this downward movement. The chisel bars 52 and 53 are supported by the hangers 54 in spaced relation to the underside of reaction member 50 as shown in Fig. 4 so as to accommodate parts of means 34, to be subsequently described.

Figure 12:
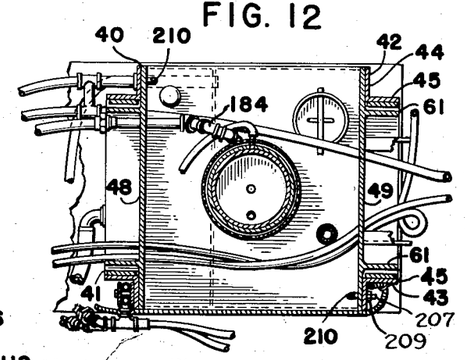
Fig. 12 is a horizontal sectional view on the line 12—12 of Fig. 1.

Likewise the lower jaw is somewhat similar in construction to the preferred mechanism shown in my aforesaid Patent 2,762,359 in that it preferably includes a lower beam or elongated horizontal reaction member 57 movably guided for up and down movement with respect to the standards 40, 41, 42 and 43, by the provision of front and rear vertical cross plates 58 and 59 respectively secured to the ends of the reaction member. These cross plates each preferably spans the distance between the outer edges of the flanges 44 of its respective pair of standards, having free sliding movement with the confronting faces of these flanges 44 as shown in Fig. 12. There may also be provided means 60, shown more in detail by way of example in Figs. 8 and 16, whereby the lower jaw may be adjusted in either direction laterally of the machine, so as to dispose the chisels thereof with their cutting edges in the same vertical plane as the cutting edges of the chisels of the upper jaw. This means comprises a vertical flange 61 rigid with the inner face of each plate 48 and 49 adjacent to but spaced from the inner face of flange 45 of each adjacent standard of the frame 23; a plate 62 extending longitudinally of each vertical flange 45 for slidable engagement with its respective flange 45; and preferably two screws 63 for each flange 61 extending in screw threaded engagement through the flange with their ends received freely in sockets 64 in the plate 62 as shown in Fig. 8. A lock nut 65 may be provided, associated with each screw to hold it in adjusted position.

Figure 10:
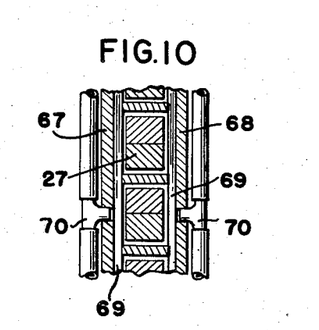
Fig. 10 is an enlarged horizontal detailed sectional view on the line 10—10 of Fig. 4.

The horizontal reaction member 57 carries a plurality of chisels 27 independently movable in substantially the same plane as that in which the chisels of the upper jaw are movable. These chisels 27 each have an upper straight horizontal cutting edge 66 and these edges are disposed in substantially the plane referred to, by chisel bars 67 and 68 supported by and extending longitudinally of the reaction member 57. The bars 67 and 68 may be ported, as shown at 69 in Fig. 10 for receiving a lubricating-wash liquid from a manifold 70 and delivering the same to the shanks of the chisels as disclosed and claimed in my aforesaid Patent 2,762,359. Incidently this arrangement for lubricating the lower chisels and associated parts and to wash away unwanted material, such as concrete fragments, dirt, etc., from the zone beneath the chisels, includes in the example shown, a sump 71 carried by the lower jaw and in which the liquid and unwanted material drops by gravity and is carried by conduit 72 to a settling tank 73. It is from this settling tank that a pump 74 derives its supply of liquid for delivery to the manifolds 70 through a conduit 75, and the sump 71 is provided with strong cover plates 76 and 77 at opposite sides of the machine, as shown in Fig. 4. The bars 67 and 68 are spaced above the reaction member 57 by end members 78 mounted on the latter so as to accommodate parts of the means 34 also to be subsequently described.

The means 30 to support and move the work pieces, one after another, in position between the jaws will now be described. It preferably comprises a work receiving table 80 supported by and movable with the lower jaw 25, and located at receiving end of the machine; a work sustaining table 81 supported by and movable with the lower jaw 25 and located between the pairs of front standards 40 and 41 and the pair of rear standards 42 and 43, and to each side of the vertical plane in which the cutting edges of the upper and lower jaws are located; a pusher 82, for the work, reciprocable with respect to the receiving table, and also carried by and movable with the lower jaw; and motor operated mechanism 83 for moving the pusher 82 back and forth as hereinafter described.

The work receiving table is preferably of elongated shape and provided with spaced longitudinally extending slots 84 so as to comprise a central longitudinal portion 85 and lateral portions 86. A rectangular frame 87, preferably supports this table. In the example shown it is made of angular end and side sections 88 and 89, respectively, each section having a horizontal flange 90 and a vertical flange 91, the frame being secured to the movable jaw 25 as by securing one of the end sections 88 to the rear plate 59 in a cut-away portion 92 thereof, and by diagonal braces 93 secured at their upper ends to the bottoms of flanges 91 and at their lower ends, to the rear plate 59.

In the example shown, the work sustaining table 81 is made to provide a slot 94 the longitudinal axis of which is in the zone in which the cutting edges 66 of chisels 27 move, but the chisels are normally disposed with their cutting edges below the plane of the table. It is preferred to make the table in two sections, a left section 95 and a right section 96, spaced to provide the slot 94. It is preferred to also pivotally mount these sections and to spring bias them to a normal position where they are coplanar as shown in Fig. 4, yet may yield to assume a limited downward and inwardly converging relationship, during the work splitting operation, as shown in Fig. 6. This may be accomplished by the provision of transverse cleats 97 secured to the underside of each of the sections 95 and 96, a standard 98 secured to the adjacent cover plate 76 or 77 as the case may be, for each cleat and having a pivotal connection 99 therewith adjacent the outer end of the cleat, a limiting device near the inner end of each cleat comprising an upstanding member 100 and a transverse bolt 101 operating in a cross slot 102 in the cleat near its inner end, and an expansion spring 103 secured between the adjacent sump cover and the underside of the table section, biasing the section to the normal position referred to, at which time, each bolt 101 is at the lower end of its respective slot 102 as shown in Fig. 15.

Figures 2, 15, 16:
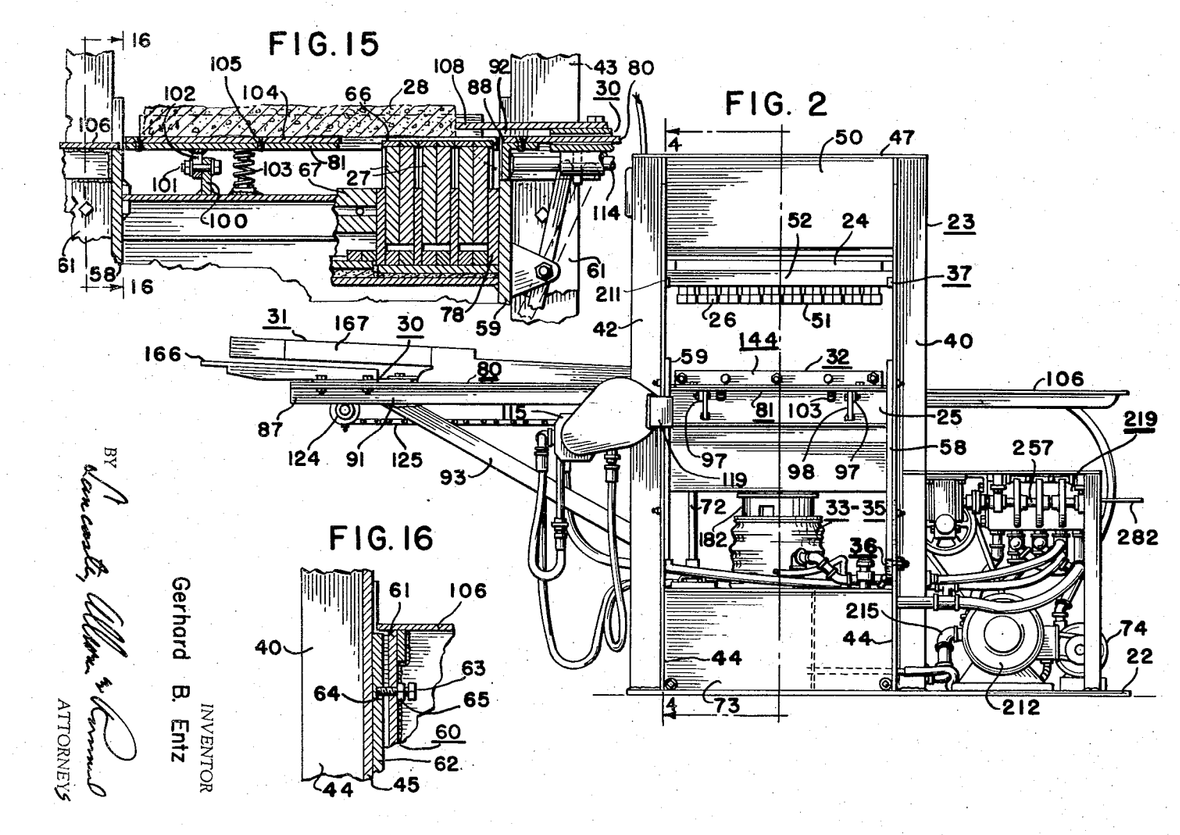
Figs. 2 and 3 are left side and front elevational views, respectively, thereof.
Figs. 13, 14 and 15 are enlarged detailed sectional views on the lines 13—13, 14—14 and 15—15, respectively, of Fig. 5.
Fig. 16 is an enlarged detailed sectional view on the line 16—16 of Fig. 15.

I may prefer to disposed the work receiving table 81 so that its upper surface is in a plane slightly above the plane of the upper surface sections 85 and 86 of the work sustaining table 80 and form as a part of the latter, removable wear strips 104, detachably secured in place by screws 105 in position to each side of slot 94 and with their upper surfaces coplanar with table 80 as shown in Fig. 15.

The pusher 82 is preferably made so that it may be adapted to act in a most satisfactory manner according to the size of the work pieces to be split during a given run of the machine, that is, to push each work piece so that it comes to rest on the sustaining table 81 with its leading end beneath the last chisel of each of the series of chisels 26 and 27 and nearest to a delivery table 106 carried by and movable with the lower jaw, as shown in Fig. 15. With this end in view the pusher comprises a hollow, relatively flat body portion 107 reciprocable longitudinally of the central longitudinal portion 85 of the work receiving table 80, and a work engaging plate 108 detachably carried by the body portion 107, adapted to engage the trailing end of the block. In its final forward position the plate 108 overlies a rearward portion of the work sustaining table 81 as shown in Fig. 15. Several of these work engaging plates are provided, each of a different length, the shortest one being for use with work pieces each of which is of the maximum length for which the machine is designed, say concrete blocks each of a length of twenty-four inches and so that when the pusher 82 is at the end of its delivery stroke, the work piece will be positioned between the upper and lower chisels with its leading end in the zone of the end chisels nearest the delivery table 106 and its trailing end in the zone of the end chisels nearest the receiving table 80. The other work engaging plates are then made of varying length, say for blocks of twenty inches and of sixteen inches in length, that is, four and eight inches longer, respectively, than the plate for pushing the maximum length blocks.

In the example shown the body portion 107 comprises an upper horizontal plate portion 109 located above the central portion 85 of the receiving table, a lower horizontal plate portion 110 therebelow, and opposite vertical side plate portions 111 movable in the slots 84 of the receiving table; and cylindrical slides 112 secured to the underside of lower plate portion 110. The selected work engaging plate 108 is detachably secured, at its rear portion, to the upper face of upper plate portion 109 by bolts 113. The slides 112 surround and are movable longitudinally of support rods 114 secured at ends to the flanges 91 of the end members 88 of frame 87, the rods 114 paralleling the slots 84.

Figures 5, 14:
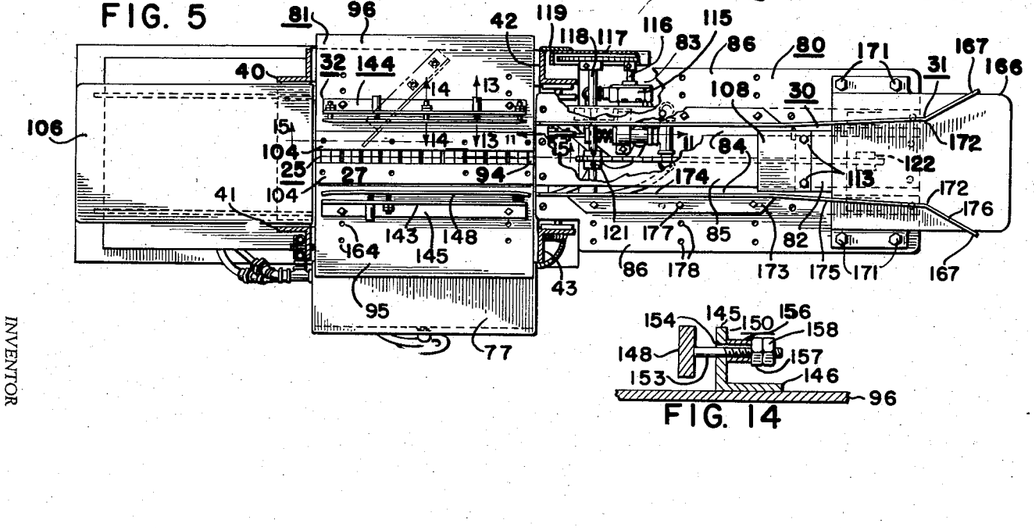
Fig. 5 is a horizontal sectional view on the line 5—5 of Fig. 1.
Figure 9:
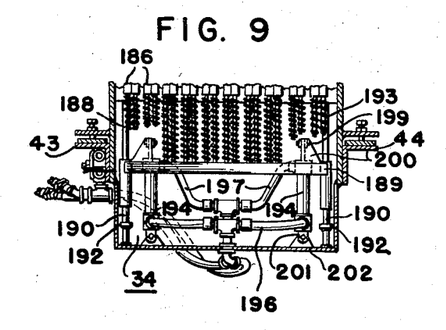
Fig. 9 is a fragmentary sectional view on the line 9—9 of Fig. 4.

The motor operated mechanism comprises, in the example shown, a hydraulically operated reversible motor 115, supported by one of the frame side sections as shown in Fig. 5, and having a drive shaft 116; speed reduction gearing 117 operated by shaft 116 and including a low speed driven shaft 118 extending transversally of the receiving table near the sustaining table, this gearing being supported by a bracket 119 secured to one side of vertical plate 59 of the lower jaw and by anti-friction bearings 120 for shaft 118, carried by the frame 87; a driving sprocket wheel 121 on shaft 118; a driven sprocket wheel 122 on a transverse shaft 123 supported by anti-friction bearings 124 secured to the frame 87 at its opposite end from shaft 118; a sprocket chain 125 trained about the wheels 121 and 122; and bracket means 126, shown in Fig. 7, securing a link of the chain to the underside of the plate 110 of pusher body portion 107 in a manner that, when the pusher is in its rearmost position as shown in Figs. 1 and 2, the motor 115 is in condition to move the pusher forward upon application of fluid under pressure into the motor in the well known manner.

Figures 11, 13:
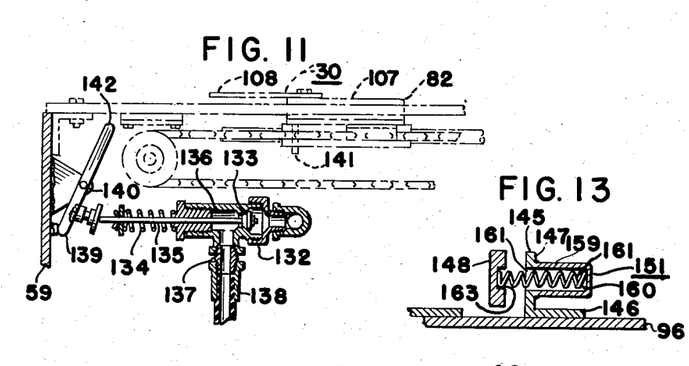
Fig. 11 is an enlarged vertical sectional view on the line 11—11 of Fig. 5, with parts shown in dotted lines.

Conduits 127 and 128, having flexible sections 129 and 130 alternately act to deliver fluid under pressure from a receiving tank 131 to the motor and return it to the tank as hereinafter described. As a safety measure I provide a pressure relief valve 132 shown in Fig. 11 and diagrammatically in Fig. 18 to relieve pressure in the motor 115 when the pusher has reached the end of its feeding stroke. This valve 132 has a valve proper 133 normally spring biased, as by expansion spring 134 operating on a stem 135 of the valve and against a head of the valve casing, to close a by-pass port 136 connected to a conduit 137 having a flexible section 138 and connected to the receiving tank 131. The relief valve is interposed in the conduit 127 and when it acts to conduct fluid under pressure to operate the motor in one direction this pressure also tends to seat the valve 133, but it is unseated by the short arm 139 of a lever, pivoted to the plate as at 140, engaging the end of the valve stem 131, and a lug 141, secured to the pusher body 107, coming into engagement with a long arm 142 of the lever, as may readily be understood from a consideration of Figs. 15 and 18.

Figure 17:
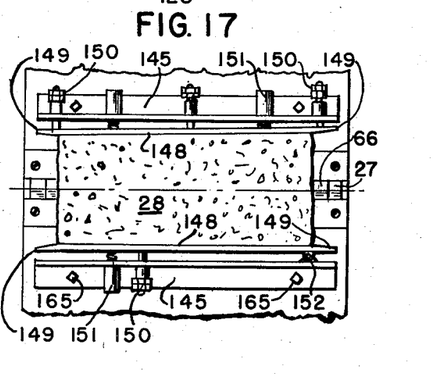
Fig. 17 is a fragmentary plan view on an enlarged scale, looking down upon a work piece of abnormal shape and portions of the machine in the zone where the splitting operation takes place.

The means 32 to guide and retain the work piece 28 in proper position with respect to the jaws for the splitting operation comprises a fence 143 carried by and adjustable on the left section 95 of sustaining table, and a fence 144 carried by and adjustable on the right section 96 of the sustaining table. Each fence preferably comprises a carrying rail 145 of angular cross section, with one flange 146 horizontal and resting upon its respective table section and its other flange 147 vertical and extending parallel to but spaced from the slot 94; a slide rail 148 preferably having its ends flared outwardly as at 149; means 150 for supporting the slide rail 148 of each fence by its carrying rail 145 and limiting the extent to which the slide rail may move toward the zone of the jaw chisels; and means 151 for yieldably biasing each slide rail 148 toward the zone of the chisels. Although concrete blocks are made with fair accuracy as to dimensions they may vary slightly due to shrinkage, removal from molds while too green or from other causes, so it is preferred to pivot the slide rail of one of the fences, such as fence 143 to its respective carrying rail, as at 152 whereby a block which is not of uniform width, as shown in Fig. 17, will be held by that particular slide rail to a position where its one side is a fixed distance from the zone where the split is made and thereby provide, from such a block at least one split section which has the desired dimensions, or rather that of each of the sections of a perfect block which has been split. Each means 150 for supporting the slide rail 148 by the carrying rail may comprise, as shown in Fig. 14, a screw threaded stem 153 extending from the outer side of the rail, through a hole 154 in the flange 147 and a spacer sleeve 156, with a nut 157 adjustable on the threaded end of the stem for engagement with the end of the sleeve 156. A lock nut 158 may be provided to hold the adjustment in the well known manner. Each means 151 shown more in detail in Fig. 13 may comprise a thimble 159 carried by the flange 147 of its respective carrying rail 145 the cavity 160 of the thimble being open to a hole 161 in the flange, and an expansion spring 162, having its one end abutting the bottom of the cavity 160 and its other end received in a recess 163 in its respective slide rail 148. Each of the table sections 95 and 96 is provided with a plurality of transverse series of screw threaded apertures 164, the apertures of each series being spaced a distance corresponding to approximately one-half of the dimension variations in the various sizes of blocks for which the machine is designed, say two inches apart, so the fences may be adjusted, and held in proper position by bolts 165 extending through the flanges 146 and into the selected apertures 165 for guiding and retaining the work piece in proper position for splitting according to its width which may be, by way of example, eight, twelve or sixteen inches as previously set forth. In Fig. 5, the fences are shown in position for guiding and holding work pieces of minimum width, such as eight inches.

The means 31 to facilitate feeding and guiding of the work pieces with respect to the means 30 comprises, in the example shown, a bridge-like entrance slide 166 mounted upon the table 80 at its end opposite from the zone of the splitting jaws, and companion guide members 167 adjustably mounted on the lateral portions 86 of the table 80. The slide 166 comprises a service plate section 168 which preferably overlies the rear portion and extends rearwardly beyond a table 80 and is inclined forwardly and downwardly as shown in Fig. 1, walls 169 at each side of the plate and horizontal attaching flanges 170 at the bottoms of the walls, secured to the lateral portions 86 of the table 80 as by bolts 171. The plate section 168 is made wide enough to support the widest type of work piece for which the machine is designed, and a workman, operating at the receiving end of the machine, has merely to place the work piece on the slide 166 and push it downwardly thereon and in front of the pusher 82 when it is at the rearward end of its stroke, in order to feed work to the machine. The guide members 167 each preferably comprise a vertical guide wall portion 172 and a horizontal attaching flange 173. Each wall portion 172 has a relatively long, straight throat forming portion 174 terminating at one end near the adjacent slide rail 148 of means 32; a somewhat shorter guide forming portion 175 in slight angular relation to portion 174 at its other end, and a mouth forming portion 176 in outwardly flaring angular relation to portion 175 at its end opposite to the juncture of portions 174 and 175. These guide members are adjustably held in position by bolts 177 received in selected screw threaded apertures 178 arranged in series in the table sections 86 in a manner similar to the arrangement of apertures 164 in table 81, the shanks of the bolts passing through the flanges 173. The guide members are arranged so that most of the guide forming and mouth forming portions 175 and 176, respectively overlie the service plate section, as shown in Fig. 5 and the space between the throat forming portions 174 is slightly greater than the width of the work pieces being fed to the machine.

The means 33 to initially cause engagement of the upper chisels with the work piece may be of the type disclosed in my aforesaid Patent 2,762,359 in that it is in the nature of a hydraulic jack comprising a cylinder 180, which may be mounted upon the base 22 with its axis vertical, a piston 181 for the cylinder and a filler piece 182 between a head 183 of the piston and the beam 57. A conduit 184 which serves to deliver fluid under pressure into the cylinder 180 and thus raise the piston and thereby raise the lower jaw of the machine, or permit exit of some of the hydraulic fluid from the cylinder, to lower the piston and thereby permit the lower jaw to descend by gravity, has connection with the means 38 for automatic operation of the jack. Thus by allowing a limited amount of fluid under pressure to enter the cylinder 180, the lower jaw is elevated and with it the work piece 28 on the table 81 until the upper chisels 26 are partly raised against the force of gravity by their cutting edges 51 engaging the upper surface of the work piece, the chisels being elevated possibly to different degrees according to the contour of the upper surface of the work piece at the zone of contact.

Likewise the means 34 for setting the chisels of the upper and lower jaws may be similar to that disclosed in the aforesaid Patent 2,762,359 in that they comprise for the chisels of each jaw, a plurality of wedges 186—one for each chisel—and adapted to be interposed to varying degrees between the chisel shanks and a wedge plate 187; a shank 188 for each wedge; a rack 189 for the shanks 188 slidable on guide rods 190 carried by the respective reaction member 50 or 57 as the case may be; a stop device 191 carried by each shank at its end opposite that which supports its respective wedge and located in a position to the outer side of rack 189, as shown in Fig. 4; a stop device 192 carried by each rod 190 to limit movement of the rack; an expansion spring 193 about each shank 188 abutting against its respective wedge and against the rack 189; and preferably two servo-motors 194 for reciprocating each rack 189, whereby the wedges are spring urged into intimate contact with and between their respective chisels and associated wedge plate 187 when the rack 189 is moved toward its associated chisels and whereby the wedges are uniformly retracted when the rack is moved away from its associated chisels. Each servo-motor 194 comprises a cylinder 195 having conduits 196 and 197 in communication with opposite ends and a plunger 198 having pivotal connection as at 199 with a bracket 200 secured to the rack 189, the cylinders 195 being pivoted as at 201 to suitable supports 202.

In Fig. 4, the means 34 are shown in positions whereby the upper chisels 26 are free to move upwardly to a limited degree if a work piece were on the table 81, and the lower jaw elevated into contact with those chisels, and the lower chisels are free to be lifted by the wedges of the means 34 associated with the lower jaw. In Fig. 6 the relative position of the parts is shown with the chisels set and actually splitting the work piece as a result of the lower jaw having been raised to a greater degree than for merely allowing the upper chisels to conform themselves with the contour of the upper surface of the work piece.

Figure 3:
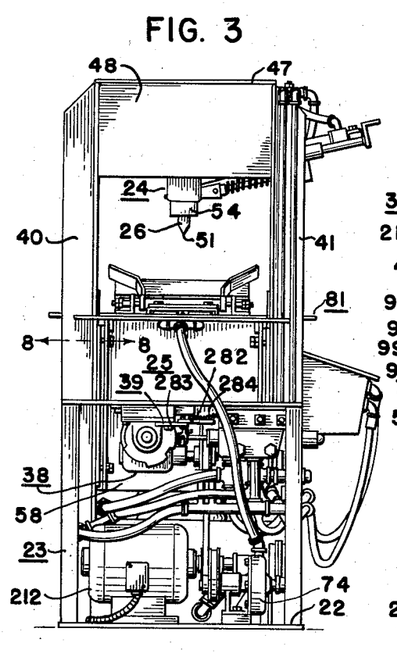

In the present example, the means 35 to move the lower jaw 25 toward the upper jaw 24, to split the work piece, and return the lower jaw to the wide open position with respect to the upper jaw 24 as shown in Figs. 1, 2 and 3 is the same means 33 previously described, although a different means might be used without departing from the spirit of the present invention, such as by rendering the upper jaw also movable and subjecting it to a percussion impact as in the patent to Johanning, 2,152,193, relating to a stone cutting machine.

The means 36, whereby the machine may be adapted for use in the speedy splitting of a run of work pieces according to their thickness, preferably comprises providing two or more stop devices on the frame 23 for cooperation with the bottoms of the plates 58 and 59 of the lower jaw to limit downward movement of the latter. In the example shown, the flange 44 of each of the standards 40 and 43 is provided with a plurality of vertically spaced apertures 206. This spacing is preferably the unit of measurement that different sizes of work pieces vary in thickness, such as two inches apart, when the machine is adapted for use in splitting block of from two to eight inches in thickness, usually being either of two, four, six or eight inches in thickness, but varying from this so at times blocks of odd thickness may be encountered, such as seven inches in thickness, by way of example. Each stop device 205 comprises a shank 207 provided with screw threads at one end, and an eccentric 208 secured at the other end, as by welding, and a nut 209 for the threaded end of shank 207. A handle 210 may be welded to the face of the eccentric opposite to that from which the shank extends. The shank 207 is received in the selected aperture 206 of the series, such as the lowermost aperture, if a run of maximum thickness blocks are to be split, disposing the eccentric 208 at the inner face of the flange, and the nut 209 is then turned on the shank 207 in firm engagement with the other side of the flange. The lower face of the plate 58 or 59, as the case may be, will then come to rest on the negative side of the cam, when the jaws are wide open and the space between the cutting edges of the upper and lower sets of chisels is slightly greater than the thickness of the blocks to be split. Variations as to this space may be accomplished by releasing the nut and turning the eccentric so that the plate upon it will engage the desired portion of the throw side of the eccentric.

The means 37 to limit the extent to which the lower jaw may move toward the upper jaw is for safety purposes and to facilitate change in position of the means 36, and may comprise blocks 211 of metal welded to the inner faces of the standards 40, 41, 42 and 43 and located in such positions that the upper faces of the plates 48 and 49 will engage these blocks, before the chisels of the upper and lower jaws contact one another.

Referring now to the means 38 to automatically operate the means 30, 33, 34 and 35, it preferably embodies some of the mechanism disclosed and claimed in the aforesaid Patent 2,762,359 which is intended to be manually operated. The means 38 comprises a prime mover 212 which may be an electric motor or a gas engine; a pump 213 operated thereby, through suitable motion transmitting means 214; the receiving tank 131, previously referred to, for the hydraulic liquid, the lower portion of which is connected to the intake of the pump 212 by a pipe 215; a control device 216 for the means 30; a control device 217 for means 34; a control device 218 for means 33—35; actuating mechanism 219 for the control devices 215, 216 and 217; and motion transmitting means 220 for operating mechanism 219 from the prime mover 212. There are also numerous conduits some of which have been described and others of which will be set forth, as well as safety devices associated with the control devices 216, 217 and 218 as the description of the preferred characteristics of the means 38 proceeds.

Figure 18:
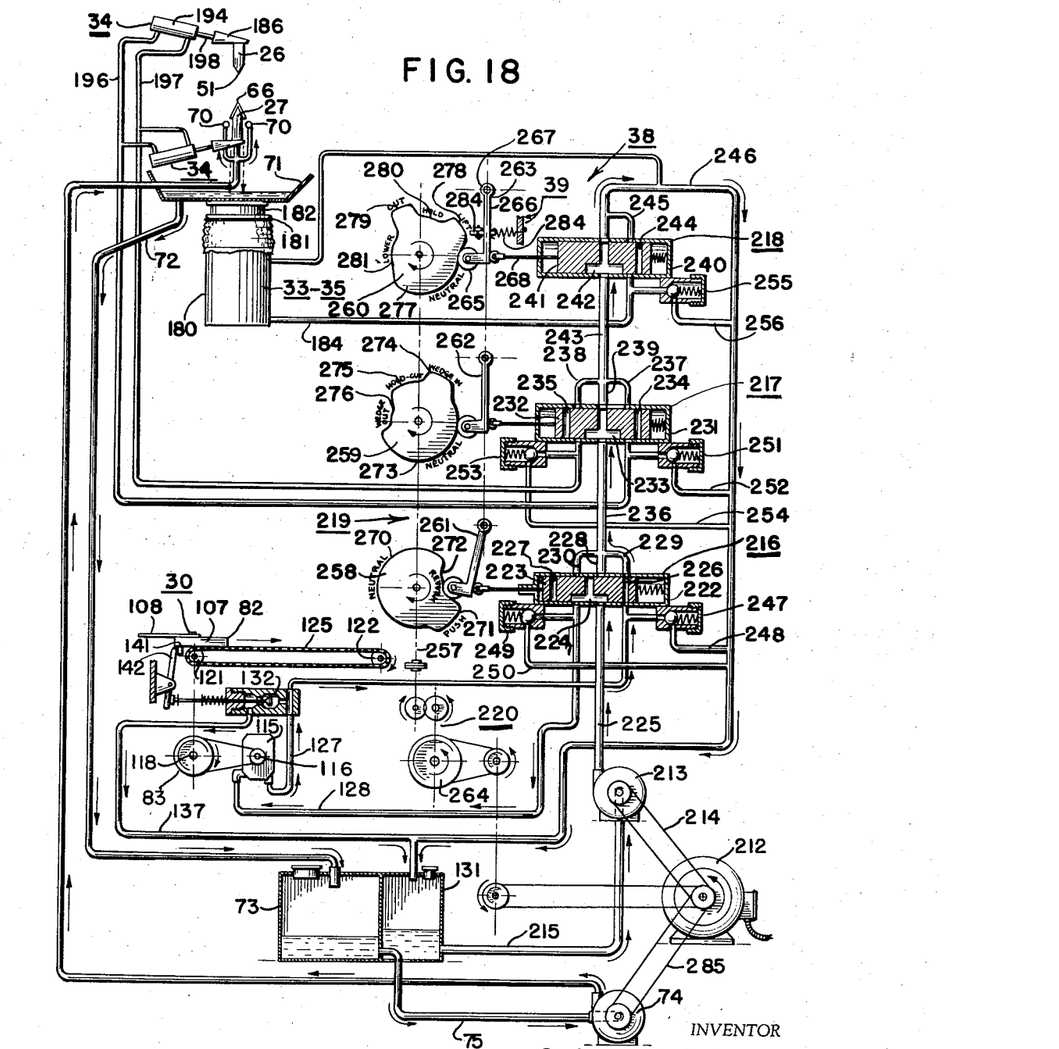
Fig. 18 is a schematic fluid flow diagram showing various control devices and parts of mechanisms to disclose the preformed construction and automatic operation of the machine, certain of the controls being in neutral position and others in position for operation of work feeding mechanism.
Figure 19:
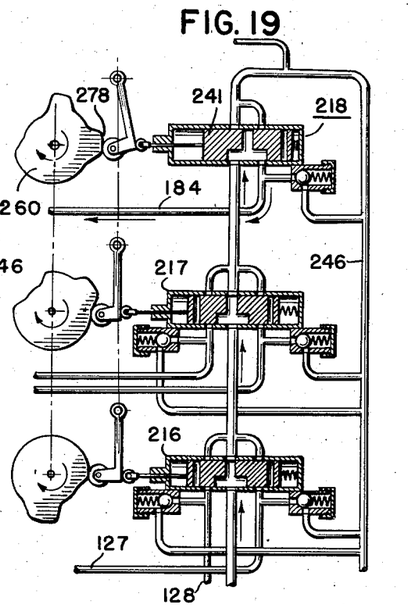
Figs. 19, 20 and 21 are fragmentary fluid flow diagrams showing certain of the controls illustrated in Fig. 18 in different positions during a cycle of operation.
Figure 20:
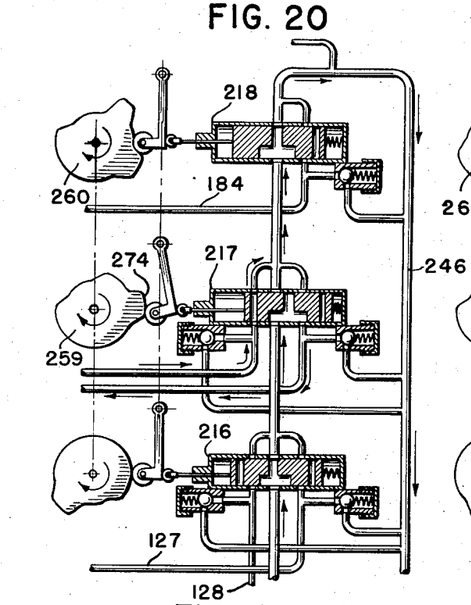
Figure 21:
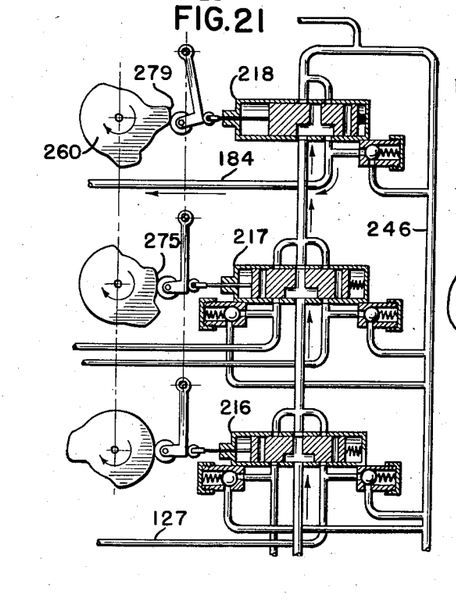

Since the first means to be operated in a cycle of operation is the means 30 reference is first had to the control device 216 and associated parts. This device comprises an elongated housing 222 in which a reciprocable valve 223 is normally spring biased toward one end of the housing (the left end, as shown in Fig. 18), although this is not the neutral position of the valve since, when the means 216 is inactive the valve 223 is held in a central position as shown in Figs. 19, 20 and 21 by the mechanism 219. The valve 223 has an inverted T-shaped transverse port 224 the head of which is always in communication with a pressurized line 225 leading from the outlet of pump 213 and open to the central portion of the housing; and transverse ports 226 and 227 at opposite sides of port 224 which may be brought alternately in communication with the conduits 127 and 128, respectively, previously referred to in connection with the reversible motor. These ports 226 and 227 are also adapted to alternately communicate with a manifold including a central branch 228 aligned with line 225 and side branches 229 and 230 aligned with the conduits 127 and 128, respectively. The manifold functions to deliver fluid under pressure to the control device 216 when the valve 223 is in neutral position, as shown in Figs. 19, 20 and 21, or permit of return of fluid under pressure from the motor 115 according to the direction in which the motor shaft 116 is turning to ultimately return to the receiving tank as shown in Fig. 18 since port 226 is in communication with conduit 127 and side branch 229. It will thus be seen that the valve 223 may take any one of three positions of rest, a central or "neutral" position as in Figs. 19, 20 and 21; a "push" position, not shown in the drawing, but obviously one where the central port 224 communicates with the conduit 127 and a "return" position shown in Fig. 18 where the central port 224 communicates with conduit 128.

The control device 217 is like the control device 216 in that it comprises an elongated housing 231, a valve 232 reciprocable therein normally spring biased toward one end of the housing, the valve having a central inverted T-shaped transverse port 233 and opposite side transverse ports 234 and 235. Also the T-shaped port is always in communication with a conduit 236 leading from manifold of device 216 and the side ports 234 and 235 are alternately brought in communication with the conduits 196 and 197 associated with the servo-motors 194 of means 34. Likewise the side ports 234 and 235 alternately communication with the side branches 237 and 238 of a manifold, for relief flow of the hydraulic medium shown in Fig. 20, and a central branch 239 of the manifold is in communication with port 223 when the valve 232 is in neutral position as shown in Figs. 18, 19 and 21.

The control device 218 is somewhat like the devices 216 and 217 but since no power other than the force of gravity is required to cause the lower jaw to descend, this control device 218 has an elongated casing 240, a valve 241 reciprocable therein, normally spring biased toward one end of the casing, and while the valve has an inverted T-shaped transverse port 242 always in communication with a conduit 243 leading from manifold of device 217, it has only one side transverse port 244 normally out of communication with the conduit 184 but capable of being brought into communication therewith for permitting back flow of hydraulic fluid from the cylinder 180 through a manifold branch 245, when the valve 214 is spring biased toward the opposite end of the housing to permit the lower jaw to descend, and under the control of mechanism 219. When the valve 241 is in a neutral position, as shown in Figs. 18 and 20, the hydraulic fluid in the cylinder 180 is locked there, so to speak, and the lower jaw of the machine is held in the position it assumed when the valve 241 was moved to a neutral position, and hydraulic fluid may then flow freely through the port 242 and into a return conduit 246 terminating in the receiving tank 131. If the valve 241 is moved in one direction from the neutral position until the head of port 242 communicates with conduit 184, as shown in Figs. 19 and 21, the jack will be operated to elevate the lower jaw of the machine, and if the valve is moved in the other direction, the port 244 will communicate with conduit 184 and with the branch conduit 245 open to the return conduit 246 with the result that the lower jaw will be permitted to descend by gravity.

As a safety measure, and to facilitate adjustment of the machine to the requirements for splitting blocks of different thickness I provide spring loaded relief valves as follows:

As to control device 216 a valve 247 interposed in a pipe line 248 between conduit 127 and the return conduit 246, and a valve 249 interposed in a pipe line 250 between conduit 128 and the return conduit 246.

As to control device 217 a valve 251 interposed in a pipe line 252 between conduit 196 and the return conduit 246, and a valve 253 interposed in a pipe line 254 between conduit 197 and the return line 246.

As to control device 218 a valve 255 interposed in a pipe line 256 between conduit 184 and the return line 246.

The mechanism 219 preferably includes a single cam shaft 257 on which are fixed cams 258, 259 and 260 associated with the valves of control devices 216, 217 and 218, through motion transmitting means 261, 262 and 263, respectively. The shaft 257 may be rotated at the desired speed, and in the desired direction, from prime mover 212 through any suitable motion transmitting means 220 indicated diagrammatically in Fig. 18, and including speed reducing gearing 264.

The motion transmitting means 261, 262 and 263 may each be substantially the same, each comprising a cam follower roller 265 on the end portion of rocker arm 266 pivoted as at 267 and a valve stem 268 connected to its respective valve, at one end, and at the other end bearing against the side of its respective rocker arm.

Each of the cams has a relatively long neutral surface, concentric with the shaft 257. These neutral surfaces hold their associated valves in neutral positions as hereinafter described. The cams also have throw surfaces and depression surfaces through which the valves are moved from neutral positions.

The cam 258 has a neutral surface 270, a throw surface 271 and a depression surface 272 so arranged, as shown in Figs. 18–21, that while the throw 271 and the depression 272 are successively engaged by the roller of its motion transmitting means 261 the pusher 82 is moved forwardly and backwardly, and while the neutral surface 270 of the cam 258 is engaged by its respective follower roller the pusher 82 remains inactive. In Fig. 18, the cam 258 is shown in the position for return stroke of the pusher 82.

The cam 259 has a relatively long neutral surface 273, a throw surface 274, a relatively short neutral surface 275 and a depression surface 276. The throw surface 274, as shown in Fig. 20, serves to actuate the wedges 186 to set positions; the short neutral surface 275 as shown in Fig. 21, functions to lock the hydraulic fluid in the cylinders of servo-motors 194 thus holding the wedges in set positions during the splitting operation of the machine; and, the depression surface 276 functions to withdraw the wedges.

The cam 260 has a relatively long neutral surface 277, two throw surfaces 278 and 279 separated by a relatively short neutral surface 280 and a depression surface 281. In Fig. 19, the throw surface 278 has caused actuation of the valve 241 to raise the lower jaw and the work piece thereon, to a position where the upper chisels are slightly raised by contact with the upper surface of the work piece. In Fig. 20, the cam 260 is shown in a position for locking the hydraulic fluid in the cylinder 180 against movement, while the chisels are being set through use of the cam 259 and in Fig. 21, the throw surface 279 is causing the lower jaw to again be elevated to bring about the splitting operation.

The means 39 for selectively operating the means 33—35 for adjusting purposes, preferably comprises a hand lever 282 pivoted intermediate its ends on a bracket 283 and having one end 284 normally spaced from the rocker arm 226 of motion transmitting means 263 by a contraction spring 284 as shown in Figs. 3 and 18, but capable of operation to manually operate the valve 241 to the position shown in Figs. 19 and 21 without relying upon the throw surfaces 278 and 279 of cam 260 to do so. As a result of manipulation of lever 282, an operator can cause the lower jaw 25 to be elevated to an abnormal position, stopped by the means 37, and there held as long as desired, without damage, since excess hydraulic fluid passing into the valve port 242 will find relief through the relief valve 255 and back to the receiving tank 215.

In Fig. 18 is shown the pump 74 for circulating lubricating-wash liquid from tank 73 to the manifolds 70, the pump being operated by prime mover 212 through motion transmitting means 285 but this forms no part of the present invention.

The control for the prime mover 212 may be of any appropriate type, but in the example shown, includes an electric switch 286 supported by a standard 43 in a position convenient to the attendant delegated to feed the work pieces into the machine. Only a second attendant is required, his duty being to remove the pieces of work after the splitting operation, and as they are pushed from between the jaws to a position upon the table 106 by the succeeding work piece.

The procedure in order to adjust the machine for splitting blocks of a size differing from that for which the machine is set for splitting purposes, is as follows:

Assuming that the machine has been set for splitting the largest block size for which the machine is adapted, say of a size each sixteen inches wide, twenty-four inches long and eight inches thick, the lower jaw 25 will be limited in its downward movement by engagement of the associated jaw end plates 48 and 49 bearing upon the adjustable stops 36 secured at the lowermost of the series of holes 206 in the frame standards 40 and 43. The horizontally reciprocating pusher body 107 will carry a pusher plate 108 of a size suitable to push a block twenty-four inches long between the machine jaws and in a zone where all of the chisels will engage the block in the splitting operation. Assume now that it is desired to adjust the machine for splitting blocks each of say twelve inches wide, twelve inches long, four inches thick, the sequence of adjustments may be as follows:

First, adjust the companion fences 143 and 144 on the sustaining table 81 so that the slide rails 148 are each a little less than six inches from the longitudinal axis of the slot 94 in the sustaining table.

Second, equip the pusher body 107 with plate of greater length than that previously used, one which will push a block twelve inches long to a position between the machine jaws with the leading end of the block beneath the last upper and lower chisels nearest the delivery end of the machine.

Third, adjust the companion guide members 167 to positions so that the throat forming portions 174 of the walls 172 thereof are spaced apart a distance slightly greater than twelve inches and offset outwardly with respect to the planes in which the confronting faces of slide rails 148 are disposed.

Fourth, set the machine in operation, and without stopping it, and while no blocks are being fed onto it, operate hand lever 282 to move valve 141 from a neutral position to that where hydraulic fluid will be delivered to the cylinder 180 and thereby lift the lower jaw as previously described and until the end plates 48 and 49 of the lower jaw engage the stops 211. When this is accomplished, the relief valve 255 will permit any excess fluid under pressure delivered into the port 242 of valve 241 to return to the tank 131 and prevent damage to the machine. While the lower jaw is thus held in the abnormal uppermost position the person making the adjustment can move the stop devices 205 to a higher position on the frame 23, such as the uppermost of the series of holes 206 in the standards 40 and 43. The hand lever 282 may then be released to resume automatic operation of the machine. It is immaterial as to the position of the cams at the time of such release of the hand lever 282 as the relief valves will prevent any damage to parts of the machine until a cycle of the cams is completed and the machine is ready to have blocks fed, one after another, into the space between the jaws 24 and 25.

While I have described the sequence of the first, second and third steps in succession and preceding the fourth step in adjustment, such is not essential. However they, in the order described, enable the first three to be accomplished while the machine is not in motion, and after the fourth step, which does require that the machine be in motion, the machine is ready for block splitting operations.

The procedure in order to adjust the machine for splitting blocks which are thicker than those previously run through the machine will be clear from the foregoing, however it has been found that the most desirable procedure is to proceed with lifting of the lower jaw to the abnormal position described, by manipulation of the hand lever 282 and holding it there until the stop devices have been lowered to the desired positions, then stop motion of the machine at a time when the depression surface 281 of cam 260 is opposite the follower roller 265. Then, upon release of the hand lever 282 the lower jaw 25 will descend by gravity until its end plates 48 and 49 rest upon the stop devices 205 in their new locations.

I claim:

1. The combination with normally open upper and lower work splitting jaws between which the work piece is acted upon, each jaw including a plurality of chisels, each of which is provided with a substantially straight horizontal cutting edge, said chisels independently movable in substantially the same vertical plane, and disposed with said cutting edges in said plane; of first means to move the work piece in a direction longitudinally of said chisel cutting edges to and support it in a position between said jaws, second means to set said chisels of said upper and lower jaws with their cutting edges in contact with the upper and lower faces, respectively, of the work piece, third means to move at least one of said jaws toward the other to split the work piece by action of said chisels, means operatively connecting said first, second and third means as a unitary system, means disposed within said system for actuating said first, second and third means successively, and motive means for operating said system.

2. The combination as specified in claim 1 in which said means disposed within said system for actuating said first, second and third means successively comprises a plurality of operatively connected control means and cam and follower means for actuating said control means.

3. The combination with normally open upper and lower work splitting jaws between which the work piece is acted upon, each jaw including a plurality of chisels, each of which is provided with a substantially straight horizontal cutting edge, said chisels independently movable in substantially the same vertical plane, and disposed with said cutting edges in said plane; of a work piece support carried by said lower jaw for supporting the work piece in a position between said jaws, first means to move the work piece in a direction longitudinally of said chisel cutting edges and into position upon said work piece support, second means to set said chisels of said upper and lower jaws with their cutting edges in contact with the upper and lower faces, respectively of the work piece, third means to move the lower jaw upwardly toward the upper jaw for the work splitting operation, means operatively connecting said first, second and third means as a unitary system, means disposed within said system for actuating said first, second and third means successively, and motive means for operating said system.

4. The combination as specified in claim 3 wherein said means for further adjustment with respect to minor differences in thickness of the work piece comprises an eccentric, the throw thereof limiting the downward movement of said lower jaw away from said upper jaw.

5. In a block splitting machine, the combination of a pair of cooperating upper and lower jaws provided with cutting means to engage the upper and lower faces of the work piece, said means having cutting edges disposed in substantially the same vertical plane, a sustaining table for the work piece comprising two sections disposed one to one side and the other to the other side of said plane, and adjacent to said lower jaw, said sections disposed in spaced relation to provide a slot, through which said cutting means of said lower jaw operates, means pivotally mounting said table sections at their outer margins, remote from said slot, to swing about axes parallel to said slot, power means to move at least one of said jaws toward the other to split the work piece, the splitting force of said power means moving the edges of said table sections adjacent said cutting means downwardly and away from said cutting means, enlarging the slot so that chips and foreign matter on said table sections will gravitate through the slot and will not act to spall at the zone of fracture of the work piece, means limiting the pivotal movement of said table sections, and spring means normally biasing said work sustaining table sections to lie in the same horizontal plane, but yieldable downwardly, upon operation of said power means, to permit said cutting means of said lower jaw to operate through said slot.

6. In a machine for splitting concrete blocks and the like by vertically spaced upper and lower jaws, having companion cutters with cutting edges disposed in substantially the same plane, a work sustaining table provided with an elongated opening through which the cutters of the lower jaw are movable so that they may be disposed with their cutting edges below the plane of the table as the work piece is moved upon the latter and moved to a position where the cutting edges are in contact with the lower face of the work piece, to cooperate with the cutters of the upper jaw for splitting the work piece resting upon said table, two spaced-apart fences on said sustaining table, one disposed to one side and the other to the other side of said opening and substantially parallel thereto, between which the work piece is guided to position between said jaws for the cutting operation, an elongated receiving table disposed with its one end in delivery relationship to said sustaining table at one end of said opening, a pusher carried receiving table and reciprocable longitudinally thereof for moving work pieces placed in said receiving table to position on said sustaining table and between said jaws and fences, and means to facilitate hand feeding the work pieces with respect to said pusher and guiding the work pieces moved on said receiving table by said pusher, said means comprising an entrance slide member, carried by said receiving table at its end portion remote from said sustaining table, including a service plate portion extending partially over the path of movement of said pusher, to receive the work pieces manually placed thereon and over which the work pieces may be manually slid to a position upon said receiving table, and two companion elongated guide members carried by said receiving table in upstanding relationship thereto, one along one side and the other along the other side of the path of movement of said pusher, said guide members having rear portions extending over said service plate portion, and forward portions terminating adjacent to said fences.

7. The machine as specified in claim 6 in which means to adjust said fences away from and toward said opening in said receiving table and means to adjust said companion guide members toward and from the path of movement of said pusher, are provided.

8. The machine as specified in claim 6 in which said elongated guide members each has a relatively long, straight throat forming portion extending from adjacent said sustaining table toward said service plate portion, a relatively shorter guide forming portion in slight outwardly directed angular relation to said throat forming portion and extending therefrom toward said service plate portion, and a mouth forming portion in outwardly flared angular relation from said guide forming portion and terminating above said service plate portion.

9. The combination with normally open upper and lower work splitting jaws between which the work piece is acted upon, each jaw including a plurality of chisels, each of which is provided with a substantially straight horizontal cutting edge, said chisels independently movable in substantially the same vertical plane, and disposed with said cutting edges in said plane; of a work piece support carried by said lower jaw for positioning the work piece between said jaws, first means mounted upon said lower jaw for moving the work piece in a direction longitudinally of said chisel cutting edges and into position upon said support, second means to set said chisels of said upper and lower jaws with their cutting edges in contact with the upper and lower faces, respectively, of the work piece, third means to move the lower jaw upwardly toward the upper jaw for the work splitting operation, means operatively connecting said first, second and third means as a unitary system, means disposed within said system for actuating said first, second and third means successively, and motive means for operating said system.

10. The combination with normally open upper and lower work splitting jaws between which the work piece is acted upon, each jaw including a plurality of chisels, each of which is provided with a substantially straight horizontal edge, said chisels independently movable in substantially the same vertical plane, and disposed with said cutting edges in said plane; of first means mounted upon said lower jaw to move the work piece in a direction longitudinally of said chisel cutting edges to and support it in a position between said jaws, second means to set said chisels of said upper and lower jaws with their cutting edges in contact with the upper and lower faces, respectively, of the work piece, third means to move the lower jaw upwardly toward the upper jaw for the work splitting operation, means operatively connecting said first, second and third means as a unitary system, means disposed within said system for actuating said first, second and third means successively, and motive means for operating said system.

11. In a block splitting machine, the combination of a frame, an upper jaw supported by said frame, a lower jaw supported by said frame for movement toward and away from said upper jaw, said jaws including cutters having cutting edges confronting one another and disposed in substantially the same vertical plane, stop means carried by said frame limiting the extent to which said lower jaw may move away from said upper jaw, said stop means being adjustable according to the thickness of the work piece to be acted upon and being bodily movable with respect to said frame for major differences in thickness of the work piece and including means for further adjustment with respect to minor differences in thickness of the work piece, power actuated means to move said lower jaw toward said upper jaw and permit it to move away from said upper jaw by gravity and come to rest on said stop means, and power driven control means to operate said power actuated means to successively move said lower jaw toward and away from said upper jaw.

12. In a block splitting machine, the combination of a pair of cooperating upper and lower jaws provided with cutting means to engage the upper and lower faces of the work piece, said means having cutting edges disposed in substantially the same vertical plane, a sustaining table for the work piece disposed to each side of said plane and providing a slot through which said cutting means of said lower jaw operates, a pair of fences mounted on said table extending longitudinally of said slot and disposed one to one side and one to the other side thereof for receiving the work piece thereupon, each of said fences having a carrying rail mounted thereon and rigid with said table, a slide rail pivotally connected at one end thereof to one of said carrying rails, said pivotal end of said slide rail being spaced from said cutting edges a specified distance according to the dimensions of the finished work piece desired, the other end of said slide rail being normally spring biased away from its carrying rail, a second slide rail movably connected to the other of said carrying rails, spring means normally biasing said last mentioned slide rail in a direction away from its carrying rail, said second mentioned slide rail interacting with said first mentioned slide rail to either side of said work piece pivoting said first mentioned slide rail to a position parallel to said cutting edges so that the side of said work piece adjacent said first mentioned slide rail will be parallel to the line of fracture of the work piece assuring that at least one of the sections of the said work piece will have the desired dimensions, and means to move one of said jaws toward the other to split the work piece by action of said cutting means while the work piece is confined between said fences.

References Cited in the file of this patent

UNITED STATES PATENTS

| | | |
|---|---|---|
| 1,084,827 | Sudre | Jan. 20, 1914 |
| 2,368,138 | Hayden | Jan. 30, 1945 |
| 2,452,706 | White | Nov. 2, 1948 |
| 2,491,901 | Moohl | Dec. 20, 1949 |
| 2,514,352 | Solomito | July 4, 1950 |
| 2,552,958 | Graham | May 15, 1951 |
| 2,592,606 | Price | Apr. 22, 1952 |
| 2,654,358 | Lake | Oct. 6, 1953 |
| 2,657,681 | Gatzke | Nov. 3, 1953 |
| 2,746,447 | Petch | May 22, 1956 |

FOREIGN PATENTS

| | | |
|---|---|---|
| 551,606 | France | Jan. 11, 1923 |